United States Patent

Wheless

[11] Patent Number: 5,817,168
[45] Date of Patent: Oct. 6, 1998

[54] AROMATIC FILTER SYSTEM

[76] Inventor: Danny W. Wheless, 410 Idlewood St., Durham, N.C. 27703

[21] Appl. No.: 661,379

[22] Filed: Jun. 11, 1996

[51] Int. Cl.$^6$ .................................................. B01D 51/000
[52] U.S. Cl. ........................ 96/222; 55/501; 55/DIG. 31; 55/511
[58] Field of Search .............................. 55/279, 501, 511, 55/524, DIG. 31, 274

[56] References Cited

U.S. PATENT DOCUMENTS

| | | |
|---|---|---|
| 3,925,043 | 12/1975 | Matrone et al. . |
| 3,992,173 | 11/1976 | Wharton et al. ............................ 55/501 |
| 4,118,226 | 10/1978 | Bourassa . |
| 4,517,308 | 5/1985 | Ehlenz et al. . |
| 4,540,625 | 9/1985 | Sherwood ............................... 428/283 |
| 4,604,114 | 8/1986 | Ward . |
| 4,676,954 | 6/1987 | Wilson . |
| 4,689,058 | 8/1987 | Vogt et al. ................................ 55/279 |
| 4,726,824 | 2/1988 | Staten . |
| 4,917,862 | 4/1990 | Kraw et al. ................................ 55/279 |
| 5,019,352 | 5/1991 | Gonzalez . |
| 5,042,997 | 8/1991 | Rhodes . |
| 5,087,273 | 2/1992 | Ward . |
| 5,240,487 | 8/1993 | Kung . |
| 5,288,298 | 2/1994 | Aston ......................................... 55/279 |
| 5,415,675 | 5/1995 | Powers et al. . |

*Primary Examiner*—Jay H. Woo
*Assistant Examiner*—Robert Hopkins
*Attorney, Agent, or Firm*—Chase & Yakimo

[57] ABSTRACT

A filter system for an HVAC system includes a rectangular frame with a central opening. A conventional filter spans the central opening for interaction with the incoming forced air. A grid spans the filter on the incoming air side thereof, the grid presenting a plurality of horizontal and vertical spaced-apart strands having aromatic particles impregnated therein. Upon contact of the incoming forced air with the grid, the aromatic particles are transferred to the incoming air so as to scent the conditioned air. The period of material transfer of the scent particles to the incoming forced air preferably corresponds with the useful filter life, such that a cessation of delivery of the scented air is indicative to the user that the filter proper needs to be changed.

9 Claims, 6 Drawing Sheets

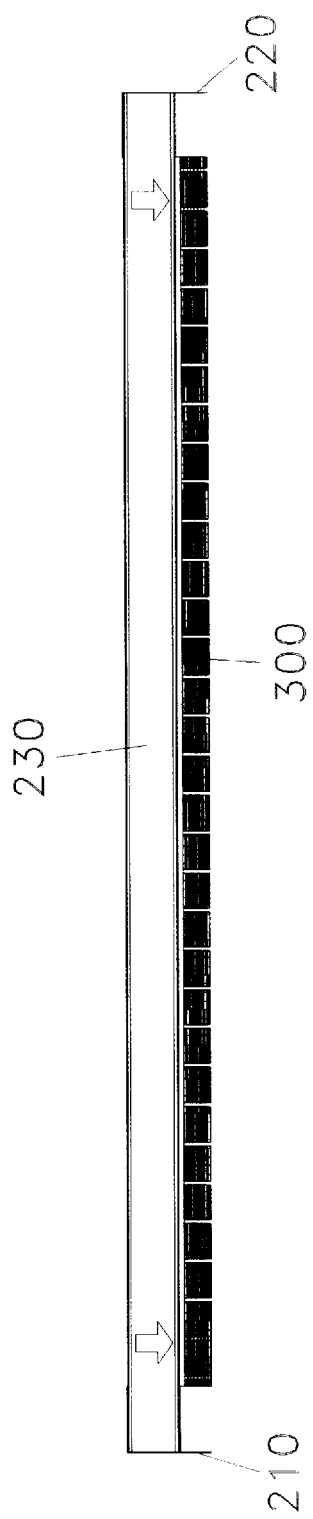

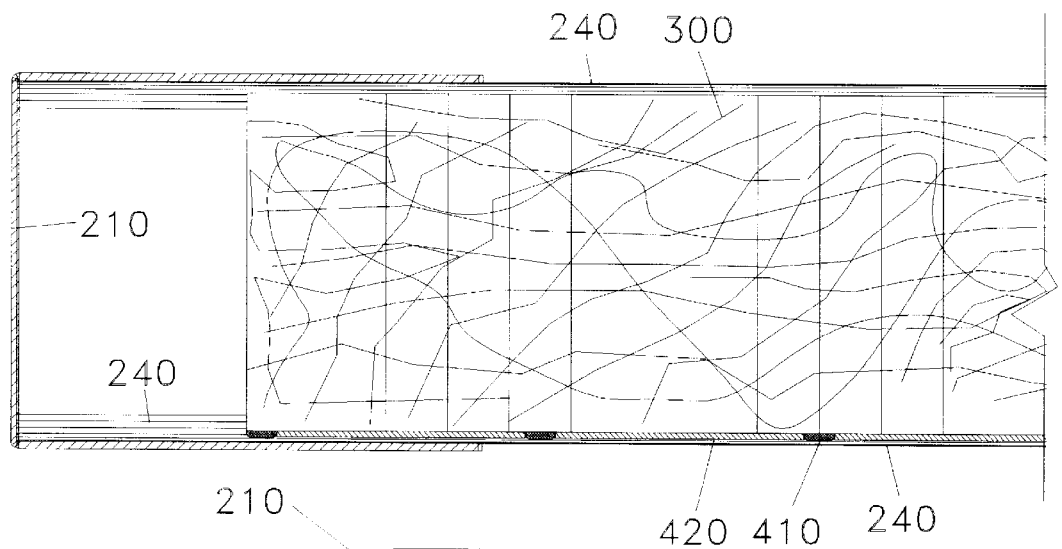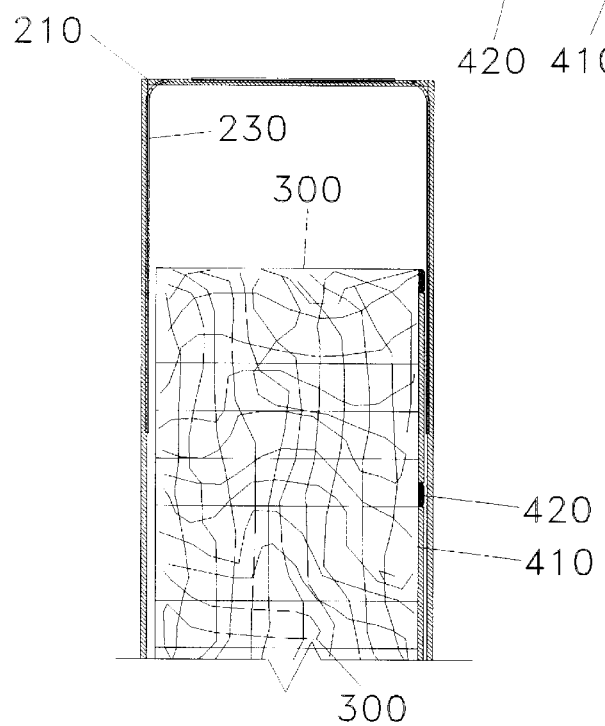

AROMATIC FILTER SYSTEM

BACKGROUND OF THE INVENTION

This invention relates to an HVAC filter system and, more particularly, to a system which will deliver fragrances to air being forced through the system, the effective period of fragrance transfer corresponding to the life of the filter proper.

Various apparatus and procedures have been proposed for the delivery of aromas into the conditioned air delivered by HVAC systems. Although assumably effective in operation, the past systems do not appear to coordinate the life of aromatic delivery with the life of the furnace filter proper. More particularly, it is desirable that a cessation of fragrance delivery into the forced air be indicative of the end of the effective life of the associated filter proper, i.e., the absence of a desired aroma in the conditioned air indicates that the furnace filter needs to be changed. Also, it is desirable to present structure which economically and effectively fronts the path of the forced air so as to optimally transfer fragrance scents thereto without significantly impeding the incoming flow of the air.

In response thereto I have invented an HVAC filter system which comprises a frame having a furnace filter spanning the frame. A grid further spans the filter on the incoming side thereof, the grid being made of a plurality of scent-impregnated strands for transferring the scent to the incoming air. The life of the scent transfer corresponds with the useful life of the furnace filter so that the absence of scent in the conditioned air will indicate that the furnace filter proper needs to be changed.

It is therefore a general object of this invention to provide an aromatic filter system for use in HVAC systems.

Still another object of this invention is to provide a system, as aforesaid, the system having a grid made of scent-impregnated materials which fronts the forced conditioned air passing through the filter.

A further object of this invention is to provide a system, as aforesaid, the length of scent transfer corresponding to the effective life of the furnace filter proper.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Turning more particularly to the drawings, FIGS. 1–6 generally show the system 100 as comprising a rectangular frame 200 with a filter 300 therein, the filter 300 having a grid 400 on an air facing side thereof.

Figure 1:
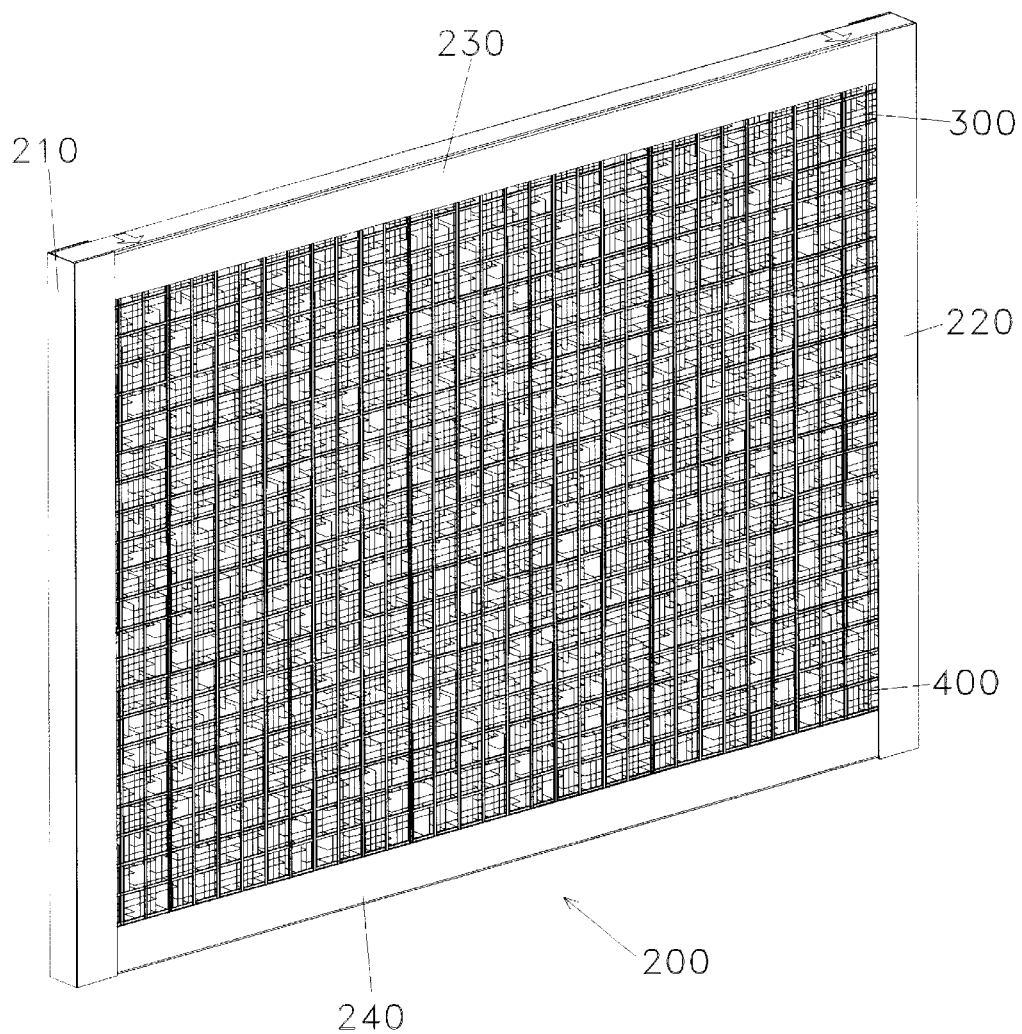
FIG. 1 is a front perspective view of the furnace filter system.
Figure 2:
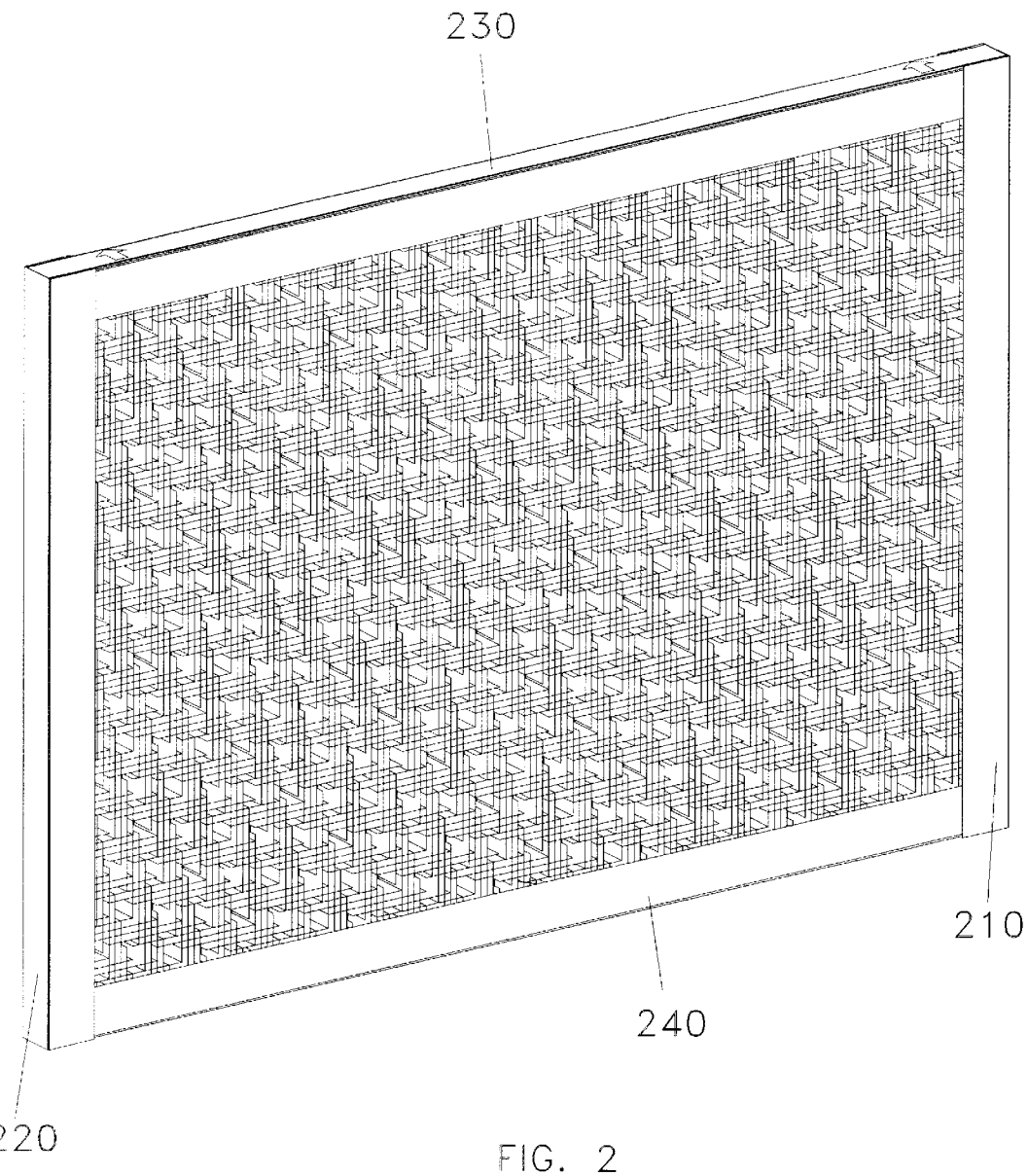
FIG. 2 is a rear view of the system shown in FIG. 1.
Figure 4:
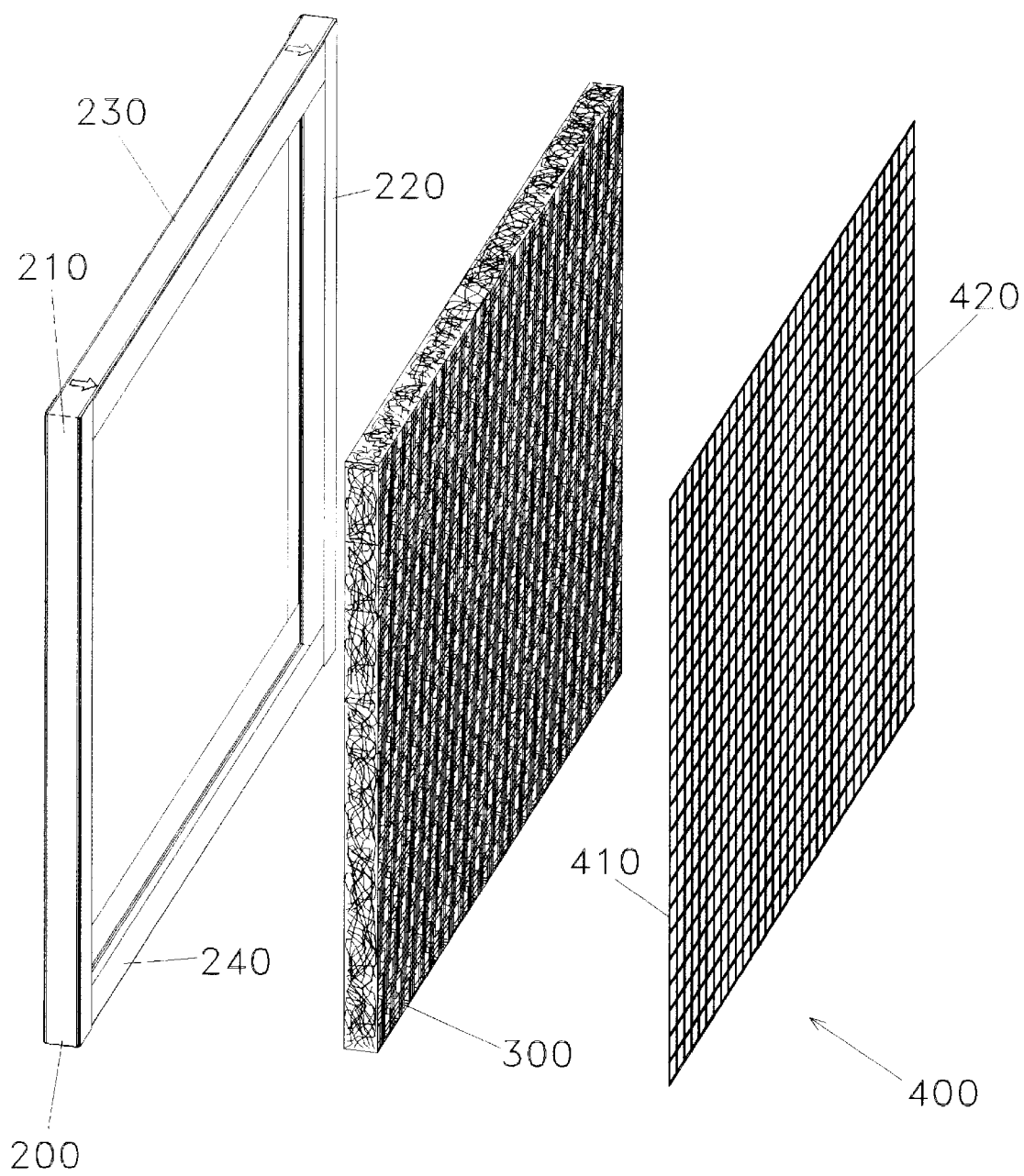
FIG. 4 is an exploded view of the system of FIG. 1.
Figure 7:
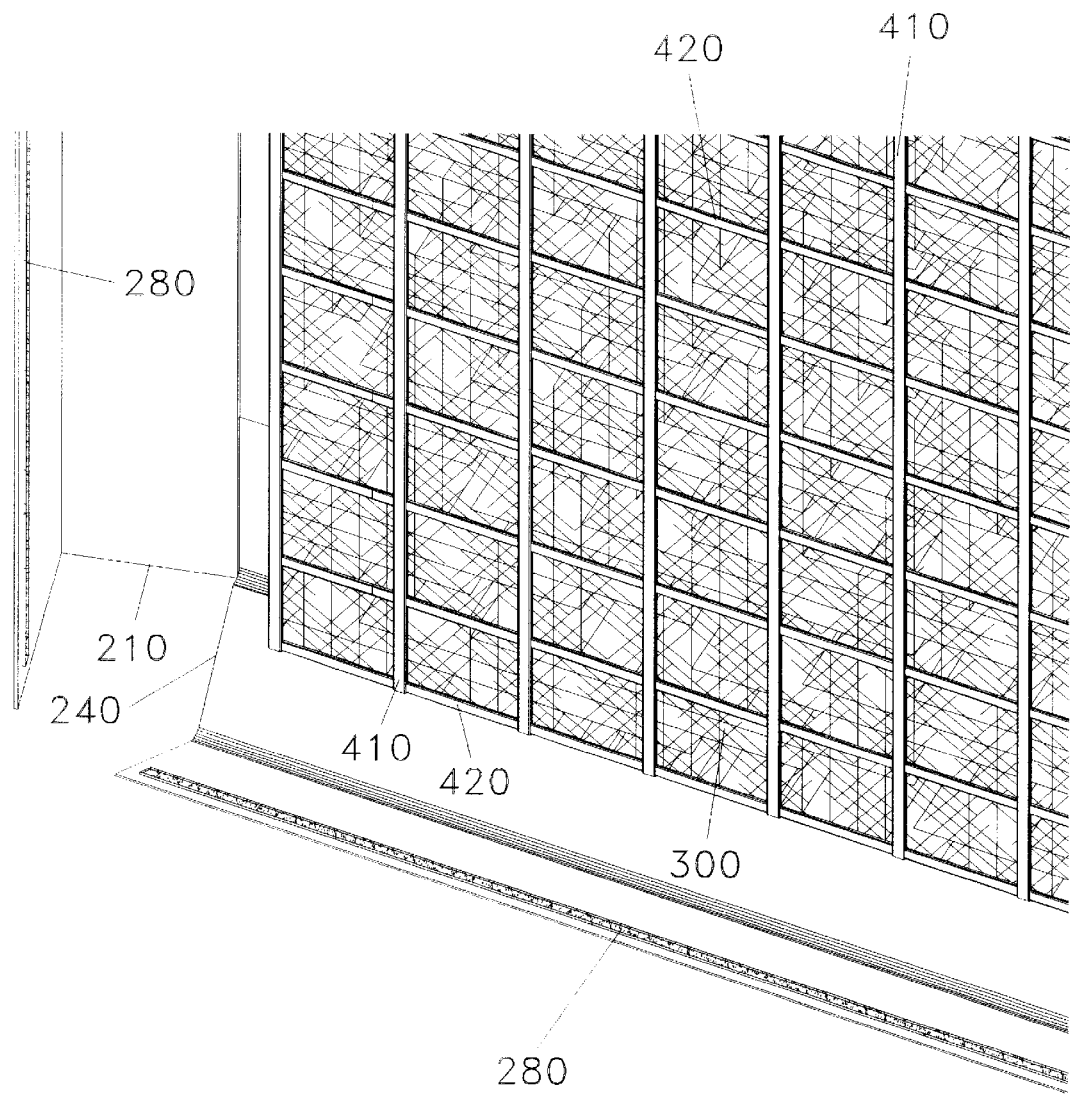
FIG. 7 is a fragmentary view of a corner of the grid showing a vertical and horizontal leg of the frame being unfolded with filter and grid therebetween.
Figure 1:
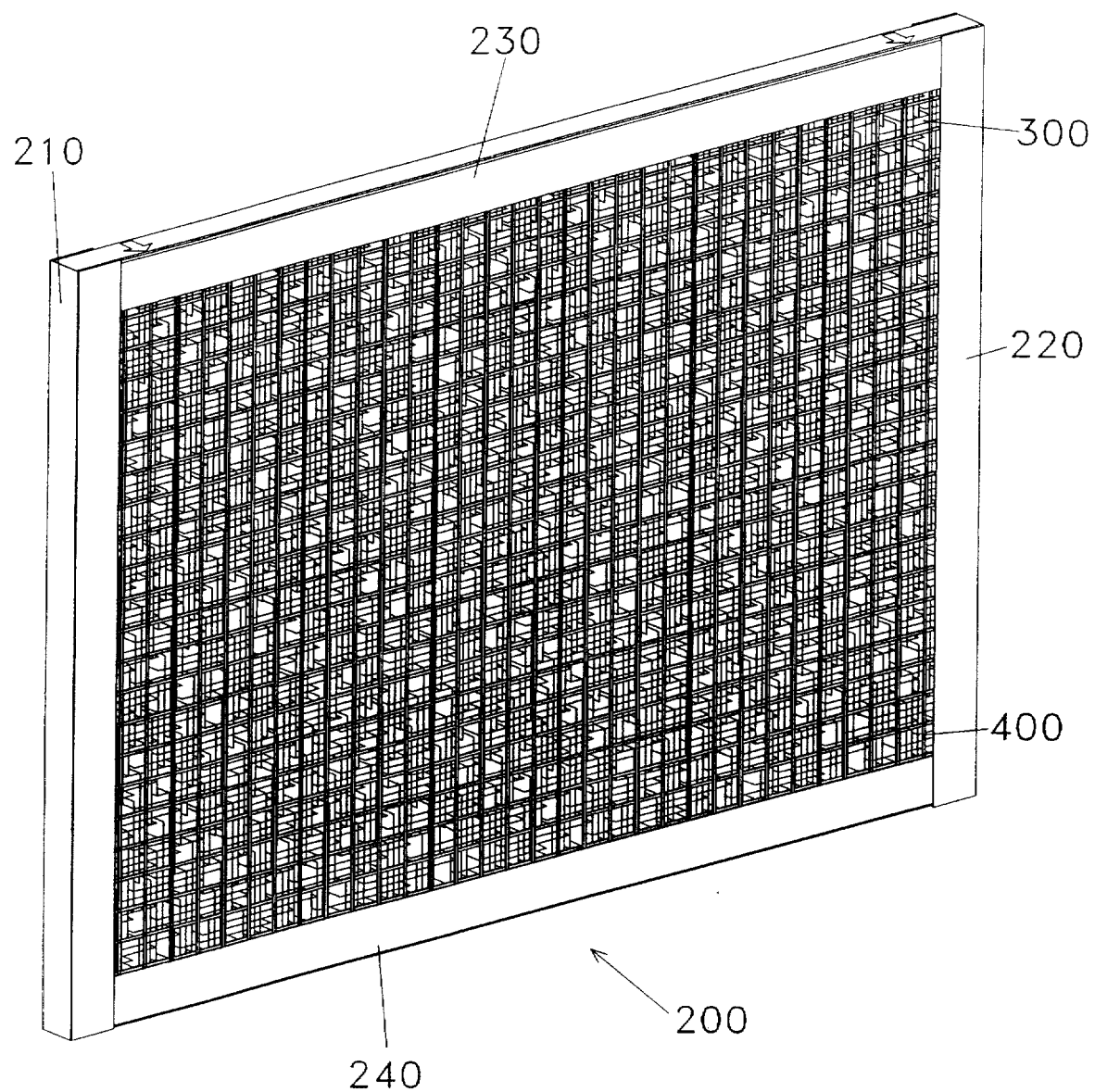
Figure 2:
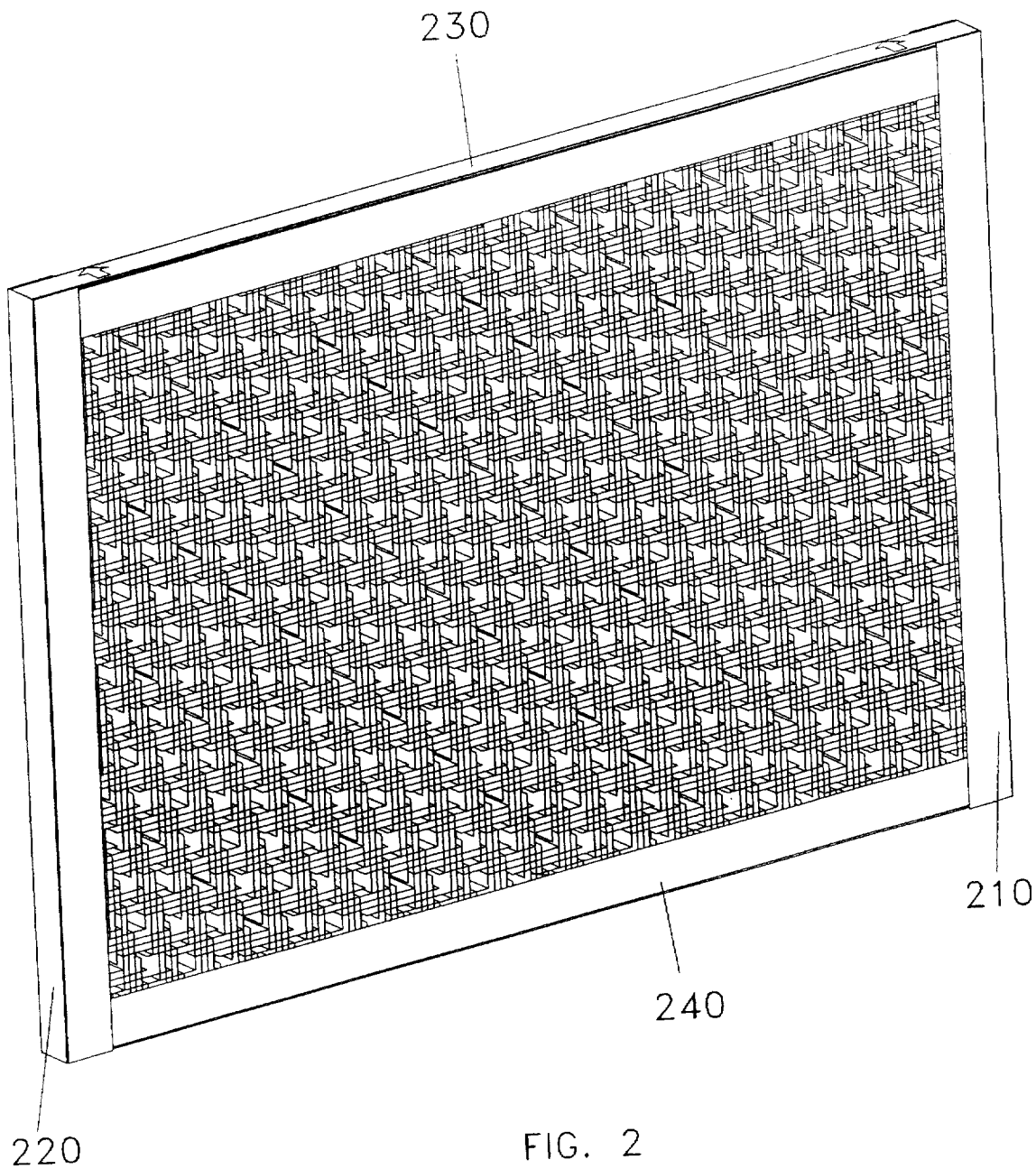
Figure 3:
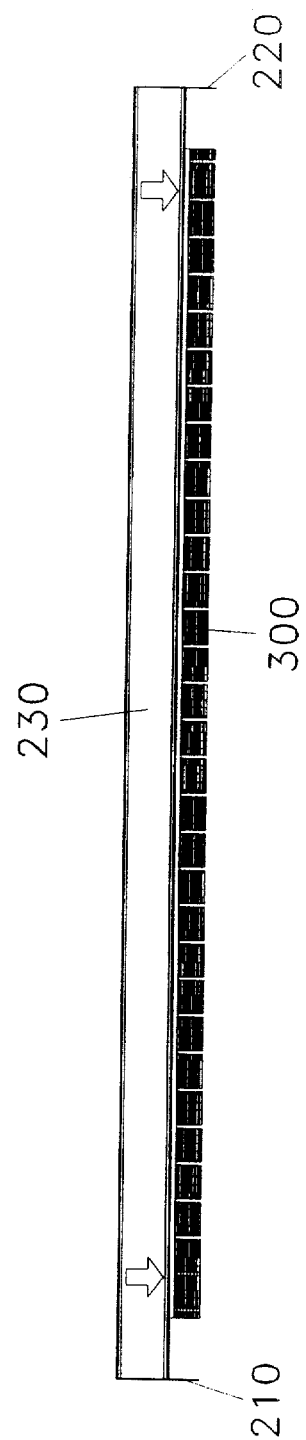
FIG. 3 is a top diagrammatic view of the system of FIG. 1.
Figure 4:
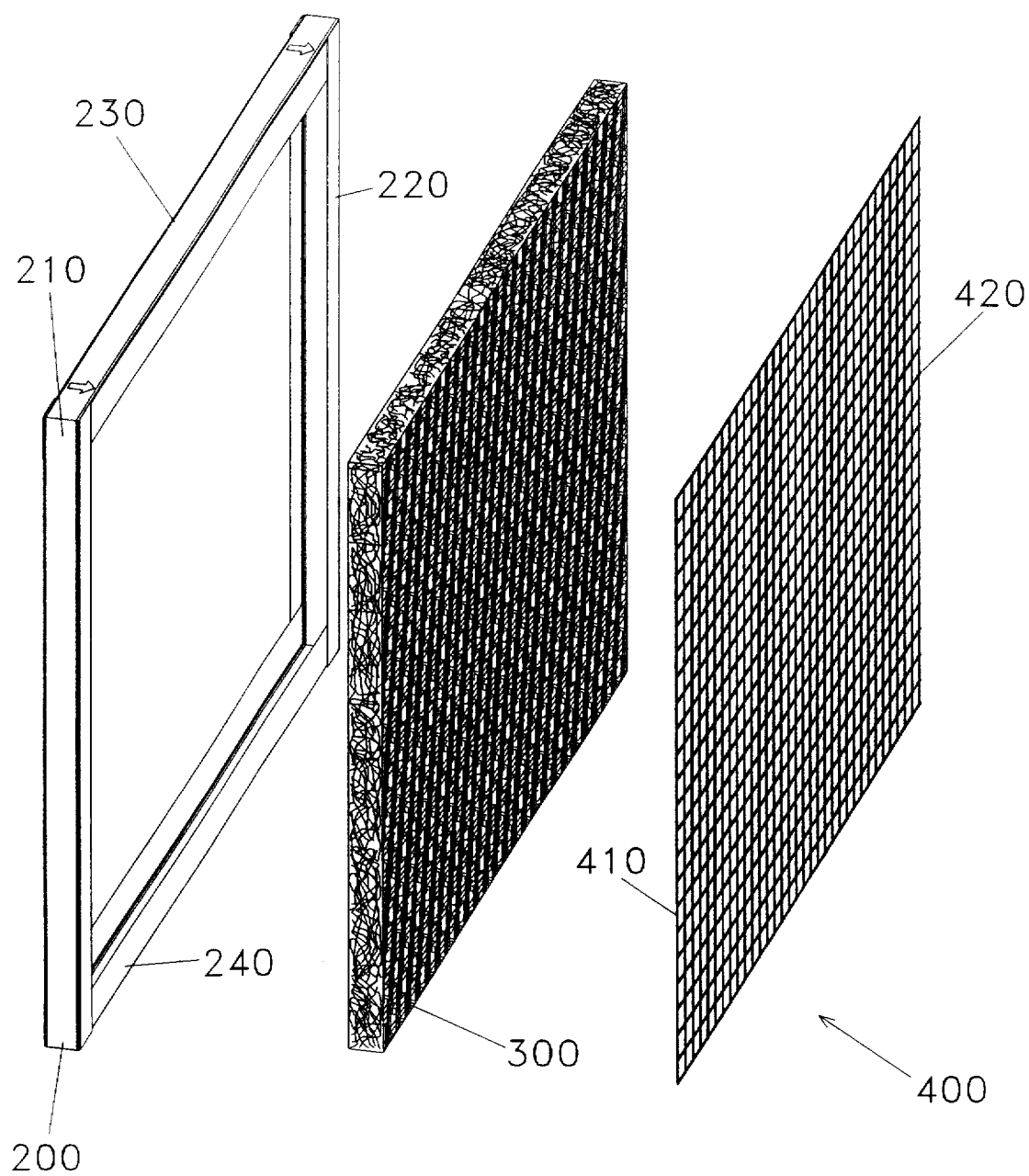
Figure 5:
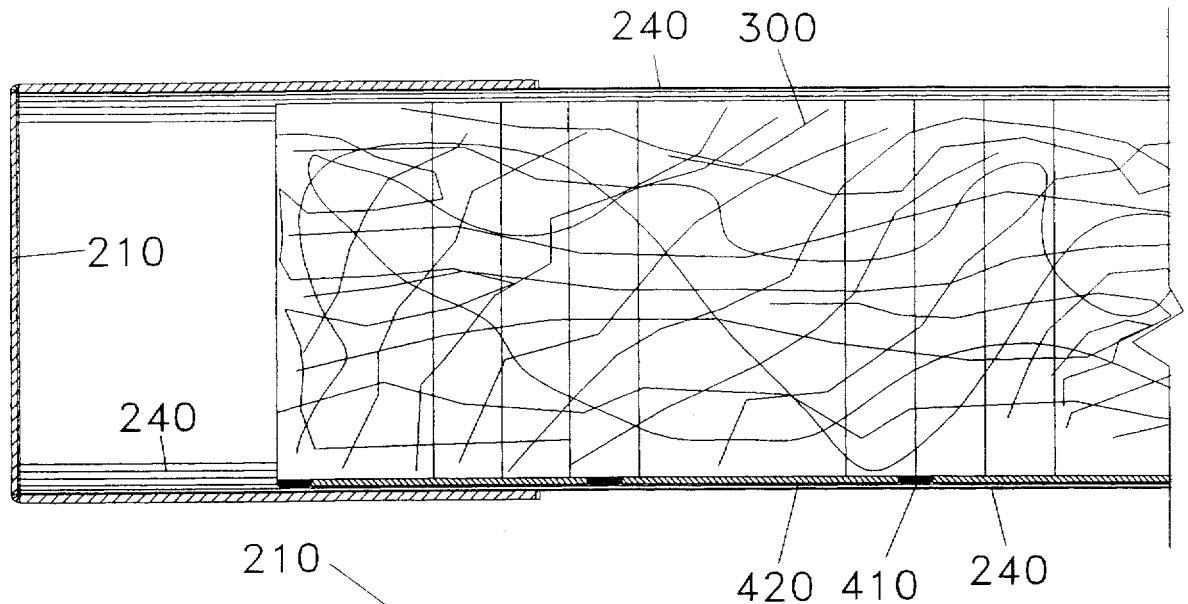
FIG. 5 is a sectional top view of one corner of the system on an enlarged scale.
Figure 6:
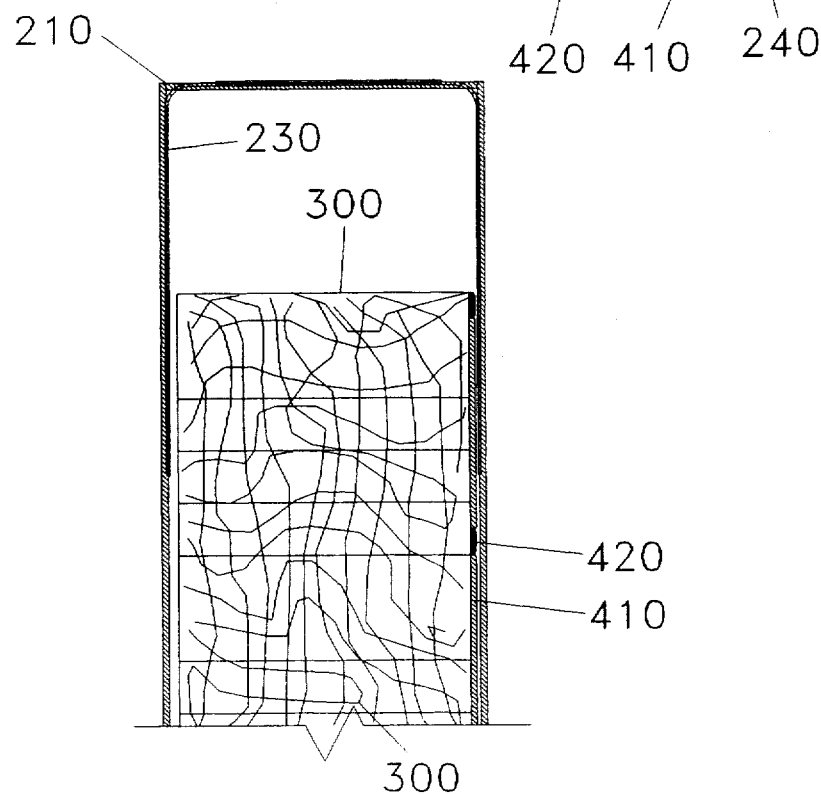
FIG. 6 is a sectional left side view of one corner of the system of FIG. 5.
Figure 7:
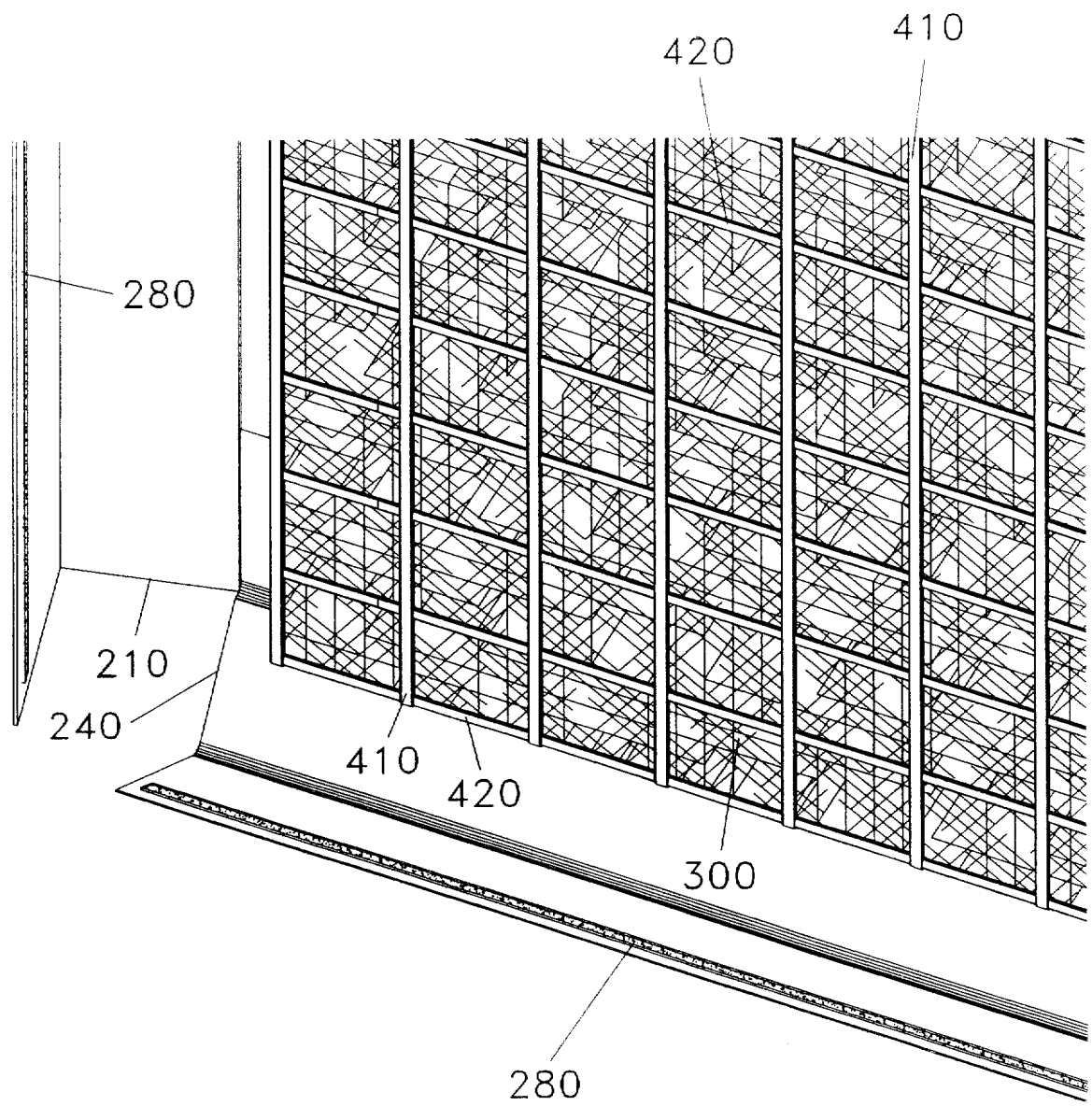

The frame 200 comprises a pair of vertical legs 210, 220 with a pair of horizontal legs 230, 240 extending therebetween. As shown, each leg 210, 220, 230, 240 is made of a form retaining material, such as cardboard or the like, with flaps of each leg having an adhesive strip 280 thereon. The legs 210, 220, 230, 240 present a channel to receive the free ends of the filter 300/grid 400 combination therein. Alternatively, as shown in FIG. 7, the legs are folded about the free ends of the filter 300 and adhered thereto by the adhesive strip 280. The overall dimension of the frame 200 is sized to fit within the space occupied by the normal filter associated with the HVAC system.

Filter 300 itself is made of a conventional air-permeable fibrous material so as to provide a conventional filtering function. The free edge of the filters extend into the channels formed by the legs 210, 220, 230, 240 of the frame 200.

A grid 400 comprises a plurality of vertical 410 and horizontal 420 strands which are placed on the side of the filter 300 facing the incoming forced air. Grid 400 is made of scent-impregnated materials which contain the desired fragrance therein, the fragrance being impregnated in the strand 410, 420 structure during the manufacture thereof. It is understood that various means of construction can be used for such grid, including dipping the grid strands into the scented material, impregnating the scent into the materials during grid strand 410, 420 manufacture, utilizing scent-impregnated fibers in the strand material or other suitable construction. Of importance is that the grid strands 410, 420 should transfer the scent particles to the forced incoming air upon operation of the HVAC system, i.e., incoming air is forced through the front face of the grid 400 filter 300 combination. Thus, as the grid 400 spans the filter 300 which contacts the incoming air, a transfer of materials, i.e., scent particles, will occur.

It is understood that the period of scent transfer is preferably coordinated with the useful life of the filter 300 such that a cessation of the scent smell in the delivered conditioned air will indicate to the user that the filter 300 needs to be changed.

It is further understood that various material transfer equations are available for use by those skilled in the art so that the delivery period of scent particles into the incoming air stream can be predetermined and thus corresponded to the desired useful life of the furnace filter 300. Thus, the coordination of the scent delivery to the conditioned air can be varied according to the environment in which the filter system is utilized. The period of utilization will necessarily be bound by periods of extreme hot or cold temperatures in the environment, as the rate of the scent transfer will necessarily increase as the use of the HVAC system increases.

It is also noted that the particular structure of the grid 400 fronts the face of the forced conditioned air such that an effective scent transfer is made along the entire face of the incoming air.

It is to be understood that while certain forms of this invention have been illustrated and described, it is not limited thereto except insofar as such limitations are included in the following claims and allowable functional equivalents thereof.

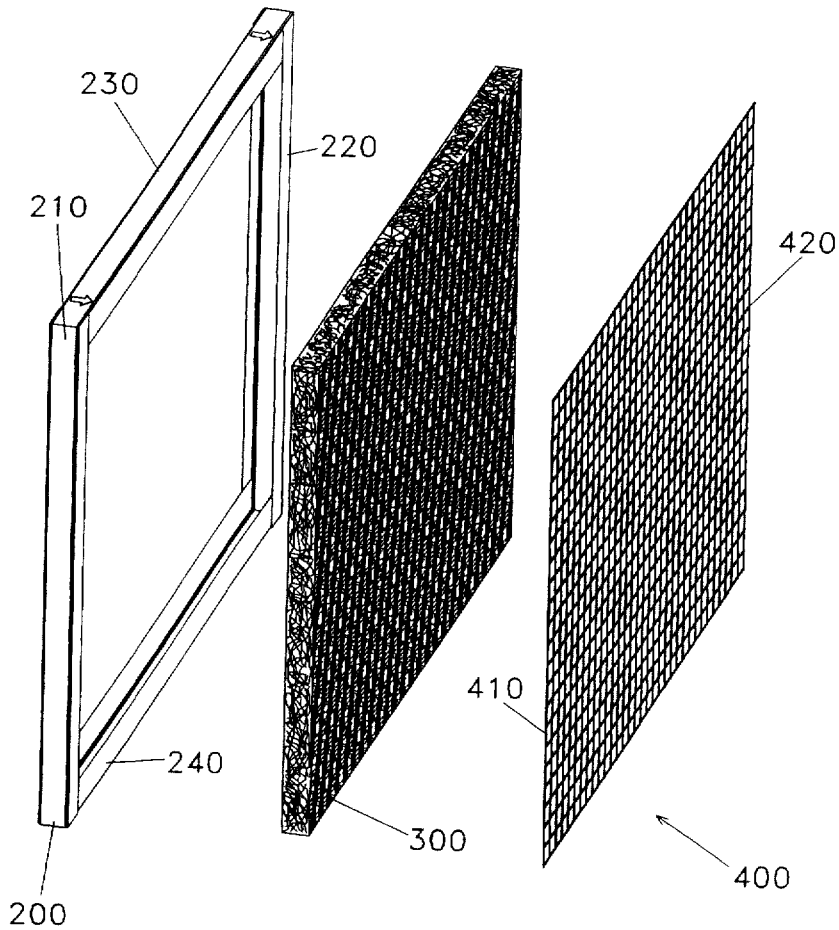

Having thus described the invention, what is claimed as new and desired to be secured by Letters Patent is as follows:

1. A filter unit for use in a forced air conditioning system comprising:

a frame presenting a central opening;

a filter spanning said frame, said filter having upstream and downstream exterior surfaces relative to an air flow, said filter adapted to interact with an upstream forced air flow provided by an air conditioning system;

a discrete grid spanning an extent of one of said exterior surfaces of said filter and said central opening, said grid comprising:

a plurality of parallel first and parallel second spaced-apart intersecting strands spanning said frame of said central opening with said plurality of said first parallel strands being generally normal to said plurality of said second parallel strands for forming uniform interstices between said strands and across said filter, said interstices presenting an unobstructed air flow through said grid to an air flow;

a plurality of aromatic particles impregnated in said strands, said particles adapted for transfer to an incoming forced air passing through said filter, said period of particle transfer corresponding to a useful life of said filter.

2. The filter system as claimed in claim 1 wherein said strands comprise a plurality of longitudinally and laterally spaced-apart strands.

3. The filter system as claimed in claim 1 wherein said frame comprises:

first and second laterally spaced-apart vertical legs having a channel respectively therein;

third and fourth spaced-apart legs spanning said first and second legs, said third and fourth legs having a channel therein, said channels receiving a free edge of said respective filter therein.

4. The filter system as claimed in claim 3 wherein each of said legs comprises:

a flap;

a piece of adhesive along said flap, said adhesive securing said flap to said grid.

5. A filter unit for use in forced air ventilation system comprising:

a frame presenting a plurality of channels surrounding a central opening;

a filter for spanning said frame, said filter having opposed exterior surfaces, said filter having free edges adapted to be received within said channels, said filter interacting with forced air provided by a forced air ventilation system;

a discrete grid spanning an extent of one of said exterior surfaces of said filter for supporting said filter, said grid comprising:

a plurality of first and second parallel strands with said first parallel strands intersecting said second parallel strands and spanning said central opening for forming uniform interstices therebetween and across said filter, said interstices presenting an unobstructed air flow through said grid;

a plurality of aromatic particles impregnated in said strands for contact with an upstream forced air flow passing through said filter, said impregnated strands adapted to transfer said aromatic particles to said flow for a period generally corresponding to an effective life of said filter.

6. The filter system as claimed in claim 5 wherein said strands comprise a plurality of longitudinally and laterally spaced-apart strands.

7. A filter unit for use in forced air ventilation system comprising:

a filter reinforced at its free edge, said filter adapted to front a forced air stream provided by a ventilation system;

a discrete grid on said filter for supporting said filter, said grid comprising:

a plurality of spaced-apart horizontal and vertical strands spanning an entire extent of said filter;

aromatic particles impregnated in said strands adapted for transfer to the incoming forced air stream passing through said filter.

8. The filter system as claimed in claim 1 wherein said grid is adjacent said upstream exterior surface of said filter.

9. The filter system as claimed in claim 5 wherein said grid is adjacent said exterior filter surface first contacting said upstream air flow.

* * * * *

UNITED STATES PATENT AND TRADEMARK OFFICE
CERTIFICATE OF CORRECTION

PATENT NO. : 5,817,168
DATED : Oct. 6, 1998
INVENTOR(S) : Wheless

It is certified that error appears in the above-identified patent and that said Letters Patent is hereby corrected as shown below:

The title page should be deleted to appear as per attached title page.

Please delete drawing sheets 1- 6 and substitute drawing sheets 1- 6 as per attached.

Signed and Sealed this

Fifth Day of January, 1999

*Attest:*

*Attesting Officer*

*Acting Commissioner of Patents and Trademarks*

United States Patent [19]

Wheless

[11] Patent Number: 5,817,168
[45] Date of Patent: Oct. 6, 1998

[54] AROMATIC FILTER SYSTEM

[76] Inventor: Danny W. Wheless, 410 Idlewood St., Durham, N.C. 27703

[21] Appl. No.: 661,379

[22] Filed: Jun. 11, 1996

[51] Int. Cl.[6] .................................................. B01D 51/000
[52] U.S. Cl. ...................... 96/222; 55/501; 55/DIG. 31; 55/511
[58] Field of Search .......................... 55/279, 501, 511, 55/524, DIG. 31, 274

[56] References Cited

U.S. PATENT DOCUMENTS

| | | |
|---|---|---|
| 3,925,043 | 12/1975 | Matrone et al. |
| 3,992,173 | 11/1976 | Wharton et al. ........................ 55/501 |
| 4,118,226 | 10/1978 | Bourassa |
| 4,517,308 | 5/1985 | Ehlenz et al. |
| 4,540,625 | 9/1985 | Sherwood ............................. 428/283 |
| 4,604,114 | 8/1986 | Ward |
| 4,676,954 | 6/1987 | Wilson |
| 4,689,058 | 8/1987 | Vogt et al. ............................... 55/279 |
| 4,726,824 | 2/1988 | Staten |
| 4,917,862 | 4/1990 | Kraw et al. .............................. 55/279 |
| 5,019,352 | 5/1991 | Gonzalez |
| 5,042,997 | 8/1991 | Rhodes |
| 5,087,273 | 2/1992 | Ward |
| 5,240,487 | 8/1993 | Kung |
| 5,288,298 | 2/1994 | Aston ..................................... 55/279 |
| 5,415,675 | 5/1995 | Powers et al. |

*Primary Examiner*—Jay H. Woo
*Assistant Examiner*—Robert Hopkins
*Attorney, Agent, or Firm*—Chase & Yakimo

[57] ABSTRACT

A filter system for an HVAC system includes a rectangular frame with a central opening. A conventional filter spans the central opening for interaction with the incoming forced air. A grid spans the filter on the incoming air side thereof, the grid presenting a plurality of horizontal and vertical spaced-apart strands having aromatic particles impregnated therein. Upon contact of the incoming forced air with the grid, the aromatic particles are transferred to the incoming air so as to scent the conditioned air. The period of material transfer of the scent particles to the incoming forced air preferably corresponds with the useful filter life, such that a cessation of delivery of the scented air is indicative to the user that the filter proper needs to be changed.

9 Claims, 6 Drawing Sheets